(12) United States Patent
Mikulski

(10) Patent No.: US 6,174,018 B1
(45) Date of Patent: Jan. 16, 2001

(54) OFF-ROAD VEHICLE FOOTREST

(76) Inventor: Janusz P. Mikulski, 10 Carol Dr., Plainville, CT (US) 06062

( * ) Notice: Under 35 U.S.C. 154(b), the term of this patent shall be extended for 0 days.

(21) Appl. No.: 09/295,184

(22) Filed: Apr. 20, 1999

(51) Int. Cl.[7] .................................................. B60N 3/06
(52) U.S. Cl. ......................................................... 296/75
(58) Field of Search .................................................. 296/75

(56) References Cited

U.S. PATENT DOCUMENTS

| | | | |
|---|---|---|---|
| 4,451,057 | * | 5/1984 | Lawson ............................ 296/75 X |
| 4,984,838 | * | 1/1991 | Kim ................................... 296/75 |
| 5,836,637 | * | 11/1998 | Laginess et al. ..................... 296/75 |

* cited by examiner

Primary Examiner—D. Glenn Dayoan
Assistant Examiner—Patricia Engle
(74) Attorney, Agent, or Firm—McCormick, Paulding & Huber LLP

(57) ABSTRACT

In a vehicle of the type having a doorway opening at least on the driver's side and including a removable door hinged to the vehicle by means of a pintle provided on the door and a hinge plate mounted to the vehicle, a footrest is provided. The footrest includes an elongated surface for supporting a driver's foot and has at least two angularly related abutment surfaces. The first abutment surface is adapted to engage the hinge plate with the other surface being adapted to engage the doorjamb of the vehicle. A fastener is received in the hinge plate of the vehicle for securing the footrest thereto.

4 Claims, 2 Drawing Sheets

OFF-ROAD VEHICLE FOOTREST

BACKGROUND OF THE INVENTION

This invention relates generally to footrests of the type provided on off-road vehicles, but may also be used on vehicles of the JEEP WRANGLER type which are used both on the road and off-road.

SUMMARY OF THE INVENTION

The invention relates generally to the provision of a removable footrest for use by the driver of the vehicle or by a passenger, as well, where the driver has removed the door and is in need of a convenient location for a footrest.

Owners of such vehicles are prone to remove the doors, providing hinge plates which would normally receive the pintles provided for this purpose on the door itself. The present invention takes advantage of this hinge plate in location, utilizing such a hinge plate as a convenient mounting for a footrest. The footrest includes angularly spaced abutment surfaces which are adapted to engage the hinge plate on the vehicle and the vehicle itself in order to brace the footrest in position so it will not rotate on the hinge axis.

BRIEF DESCRIPTION OF THE DRAWINGS

A more complete understanding of the invention and many of the attendant advantages will be readily appreciated as the same becomes better understood by reference to the following detailed description when considered in conjunction with the accompanying drawings wherein.

DETAILED DESCRIPTION

Figure 1:
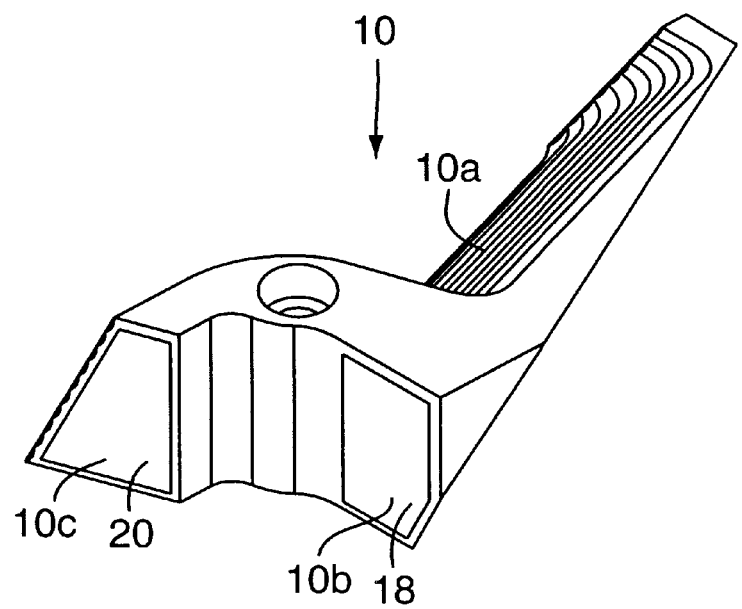
FIG. 1 is a perspective view of a footrest constructed in accordance with the present invention.
Figure 2:
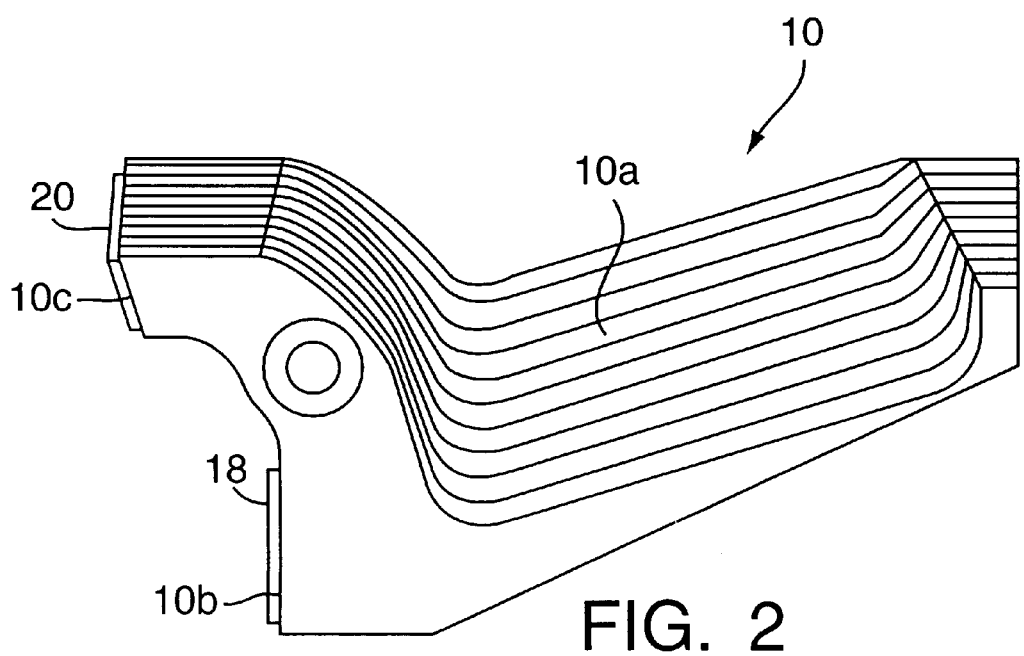
FIG. 2 is a top view of the footrest of FIG. 1.
Figure 3:
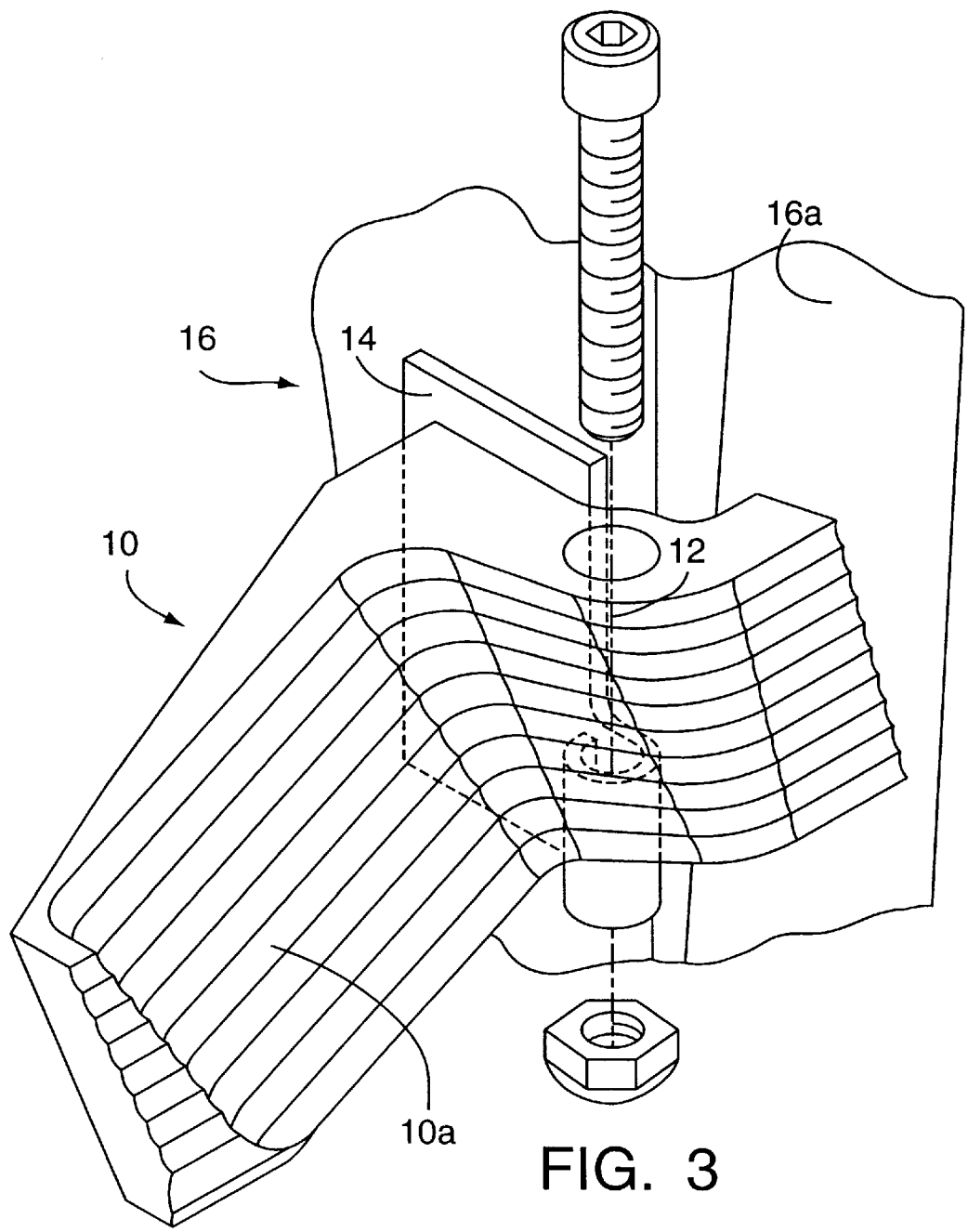
FIG. 3 is a perspective view illustrating the vehicle hinge plate hardware, and the applicable portion of a vehicle such as might be suited for application in the present invention.

Turning now to the drawings in greater detail, FIG. 1 shows the footrest 10 as including an inclined surface 10a oriented at an angle with respect to the hinge axis 12 of the hinge plate 14 associated with the vehicle 16. The vehicle is shown in FIG. 3 as including a door opening 16a and associated hinge plate 14 which are permanently affixed to the vehicle, and which are normally used in supporting a removable door (not shown).

The footrest 10 also includes angularly related abutment surfaces 10b and 10c which are adapted to engage the exterior surfaces of the vehicle, preferably in the form of the hinge plate 14, and the doorjamb 16a of the vehicle, respectively.

A pad of elastomeric material 18 and 20 such as rubber is provided on these abutment surfaces of the footrest so as to serve two purposes. First, these resilient elastomeric pads will assure that the footrest is held in place on the vehicle and will not inadvertently become dislodged from its associated mounting. Second, these surfaces also function as protective devices for avoiding damage to the vehicle by the footrest which is preferably machined from aluminum.

The footrest further includes a central opening for receiving a mounting pin of the same diameter and configuration as the mounting pintle normally provided on the removable door.

Alternative constructions will occur to those skilled in the art given the foregoing disclosure of a novel footrest suitable for use on an off-road vehicle, particularly a vehicle of the type having a hinge plate adapted to accept a pintle hinge such as normally provided on removable doors of such vehicles. The footrest itself is preferably fabricated from a metal material and is machined to the desired shape shown but may alternatively be fabricated from other materials, as for example, high impact thermoplastic or polymer materials of the type presently available. The inclined surface 10a may be provided with a non-skid surface.

Thus, it would be understood that within the scope of the amended claims, the invention may be practiced otherwise than as specifically described.

What is claimed is:

1. The combination comprising a vehicle of the type having a doorway opening at least on the driver's side, and including a removable door hinged to the vehicle by means of a pintle provided on the door and a hinge plate mounted on the vehicle, and a footrest having an elongated surface for engagement with the driver's foot, said footrest including at least two angularly related abutment surfaces, the first of which is adapted to engage the hinge plate, and the other of which surfaces is adapted to engage a doorjamb of the vehicle, a fastener received in a central opening provided in the footrest, said fastener also being received in the hinge plate of the vehicle for securing said footrest to said hinge plate.

2. The combination according to claim 1 further characterized by elastomeric pads provided on each of said abutment surfaces of said footrest for resiliently engaging the vehicle hinge plate and vehicle doorjamb.

3. The combination according to claim 1 wherein said elongated surface of said footrest is inclined both with respect to the axis defined by the hinge line of the hinge plate, and is also inclined with respect to the abutment surfaces.

4. The combination according to claim 1 wherein said elongated surface of said footrest is provided with a non-skid surface.

* * * * *